United States Patent [19]

Ebersole

[11] Patent Number: 5,043,938
[45] Date of Patent: Aug. 27, 1991

[54] NODE CONTROLLER FOR A LOCAL AREA NETWORK

[75] Inventor: Ronald J. Ebersole, Beaverton, Oreg.

[73] Assignee: Intel Corporation, Santa Clara, Calif.

[21] Appl. No.: 598,813

[22] Filed: Oct. 17, 1990

Related U.S. Application Data

[63] Continuation of Ser. No. 291,640, Dec. 29, 1988, abandoned.

[51] Int. Cl.⁵ .................... H04L 12/28; H04L 12/40; H04L 12/42
[52] U.S. Cl. .................... 364/900; 364/940.62; 364/940.63; 364/940.64; 340/825.03; 340/835.05; 370/61; 370/85.15; 370/85.5
[58] Field of Search ........................................ 364/900

[56] References Cited

U.S. PATENT DOCUMENTS

| | | | |
|---|---|---|---|
| 4,768,190 | 8/1988 | Giancarlo | 370/85.15 |
| 4,769,813 | 9/1988 | Lenart | 370/85.15 |
| 4,803,485 | 2/1989 | Rypinsky | 340/825.05 |
| 4,857,709 | 7/1989 | Matsumoto et al. | 340/825.05 |

OTHER PUBLICATIONS

Ralston, Anthony and Edwin D. Reilly, Jr., Memory--Mapped I/O, *Encyclopedia of Computer Science and Engineering*, p. 967 (2nd Ed. 1983).

Primary Examiner—Gareth D. Shaw
Assistant Examiner—Matthew C. Fagan
Attorney, Agent, or Firm—Owen L. Lamb

[57] ABSTRACT

A controller has a node interface logic (40), a ring bus interface logic (42), a set of input pins (44) and a set of output pins (45). A common logic (58) is connected to the node interface logic (40) and to the ring bus interface logic (42). The common logic includes an output FIFO buffer (32) connected to an output link interface (37) and an input FIFO buffer (34) connected to an input link interface (36). A mode select pin (43) is provided for selecting a node controller mode of operation and a ring controller mode of operation. The node interface (40) responds to assertion of the selection pin (43) to activate the pins (44, 45) with respect to the node interface (40). The ring bus interface (42) responds to deassertion of the select pin (43) to activate the pins (44, 45) with respect to the ring bus interface (42).

2 Claims, 2 Drawing Sheets

NODE CONTROLLER FOR A LOCAL AREA NETWORK

This is a continuation of application Ser. No. 291,640 filed Dec. 29, 1988, abandoned.

CROSS REFERENCE TO RELATED APPLICATIONS

"Local Area Network Having an Active Star Topology" Ser. No. 07/291,700 of Ronald J. Ebersole et al; "Cluster Link Interface" U.S. Pat. No. 4,939,724 of Ronald J. Ebersole; and "Local Area Network Having an Active Star Topology" Ser. No. 07/291,594 of Ronald J. Ebersole all filed concurrently herewith and assigned to Intel Corporation.

BACKGROUND OF THE INVENTION

1. Field of the Invention

The invention relates to data processing systems and more particularly to apparatus for controlling message transfers within a local area network.

2. Description of the Related Art

A Local Area Network, or LAN, is a data communications system which allows a number of independent devices to communicate with each other within a moderately sized geographical area. The term LAN is used to describe networks in which most of the processing tasks are performed by a workstation such as a personal computer rather than by shared resources.

A LAN consists of a desktop workstation which performs processing tasks and serves as the user's interface to the network. A wiring system connects the workstations together, and a software operating system handles the execution of tasks on the network.

In the above-referenced application Ser. No. 07/291,700 there is described a Local Area Network architecture based on a active star topology. Nodes attach to the hub of the star through duplex communication links. Messages transferred between nodes are passed through the hub, which is responsible for arbitration and routing of messages. Unlike the prior bus topology, or ring topology, each node of the active star receives only those messages that are intended for it. Routing of messages is accomplished by a destination address in the header of the message. Destination addresses are unique to each node and provide the means by which the hub keeps the communication between nodes independent.

A number of ring controllers are connected together in a closed ring to form the Hub of the star. Node controllers located at the source and destination nodes control message flow into and from the nodes. The ring controllers and node controllers perform many of the same internal functions. However they connect externally to different network media and to either a parallel ring bus in the case of a ring controller or to DMA type of I/O bus of a processor in the case of a node controller. It is advantageous to have single component for both ring controllers and node controllers capable of operating in different modes depending upon the location of the component in the network.

It is therefore an object of the present invention to provide an improved LAN controller that has the ability to connect to a number different interfaces in the network and to be set to operate in a number of different modes.

SUMMARY OF THE INVENTION

Briefly, the above object is accomplished in accordance with the present invention by providing a cluster interface controller which includes a node interface logic, a ring bus interface logic, a link interface and a common logic. The common logic includes an output FIFO buffer connected to an output link interface and an input FIFO buffer connected to an input link interface. Mode selection means are provided for selecting a node controller mode of operation or a ring controller mode of operation. Means responsive to the selection means connect the internal common logic to a first set of I/O interface pin functions and timings corresponding to the first mode of operation and select a second set of I/O interface pin functions and timings corresponding to the second mode of operation depending upon the mode selected.

DESCRIPTION OF THE PREFERRED EMBODIMENTS

Figure 1:
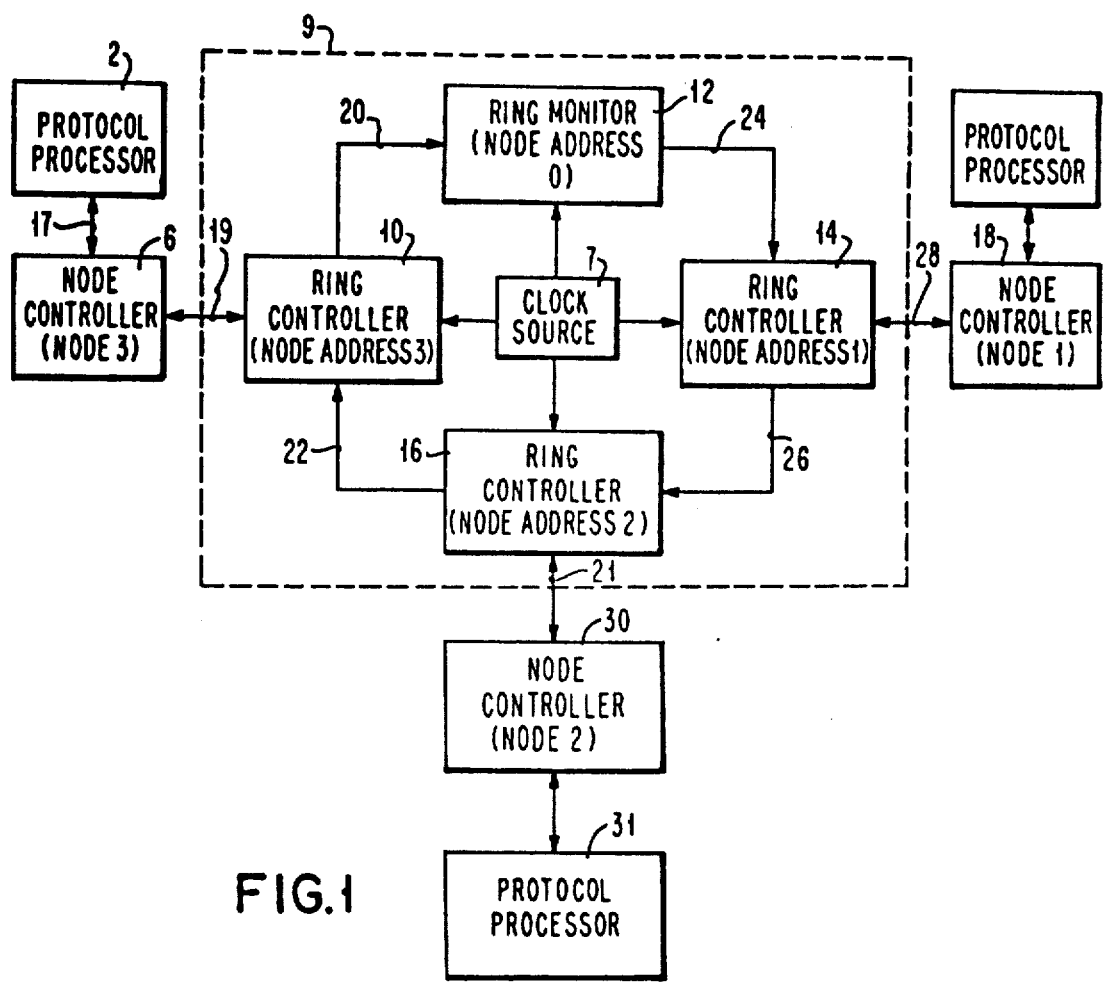
FIG. 1 is a functional block diagram of the Local Area Network in which the present invention may be embodied.

Refer to FIG. 1 which is a functional block diagram of the Local Area Network in which the controller of the present invention may be embodied. The Local Area Network is more fully described in the above-referenced copending application Ser. No. 07/291,700. Two methods of interfacing a node (2, 6) to the hub (9) are provided. The IEEE Standard 802.3 compatible link interface allows a node compatible with IEEE Standard 802.3 (referred to herein as an 802.3 node) to be directly attached to a Hub through one of several different available 802.3 media links. High performance nodes use the cluster interface controller (CLIC) with the Node Controller mode selected. The Node Controller provides for high bandwidth links and supports low latency protocols.

IEEE 802.3 Link Interface

Each CLIC (6, 10, 12, 14, 16, 18, 30) shown in FIG. 1, is capable of operating in two basic operational modes, the Node Controller mode and the Ring Controller mode. Additionally one selected ring controller (12) is set to operate in the monitor mode.

Figure 2:
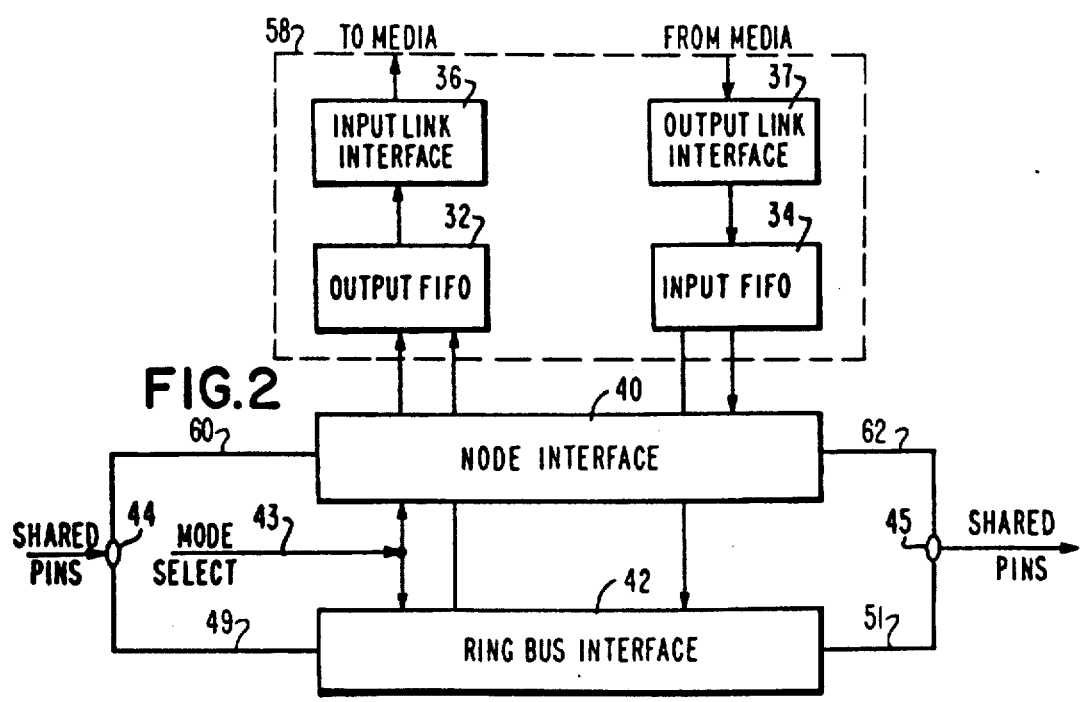
FIG. 2 is a functional block diagram of the interface controller of the present invention; and, FIG. 3 is a more detailed block diagram of the interface controller shown in FIG. 2.

Refer to FIG. 2. A common block of logic (58), including the FIFO buffers (32, 34) output link interface (36) and input link interface (37), is shared by two independent logic blocks (40, 42) that implement the operational modes. When the Node Controller mode is selected by the mode select line (43), node interface logic (40) is activated, the interface pins (44, 45) are dedicated to it, and the Ring bus hub logic (42) is disabled. The I/O Interface pin functions and timing are determined by the mode selected.

Node Controller Mode of Operation

Figure 3:
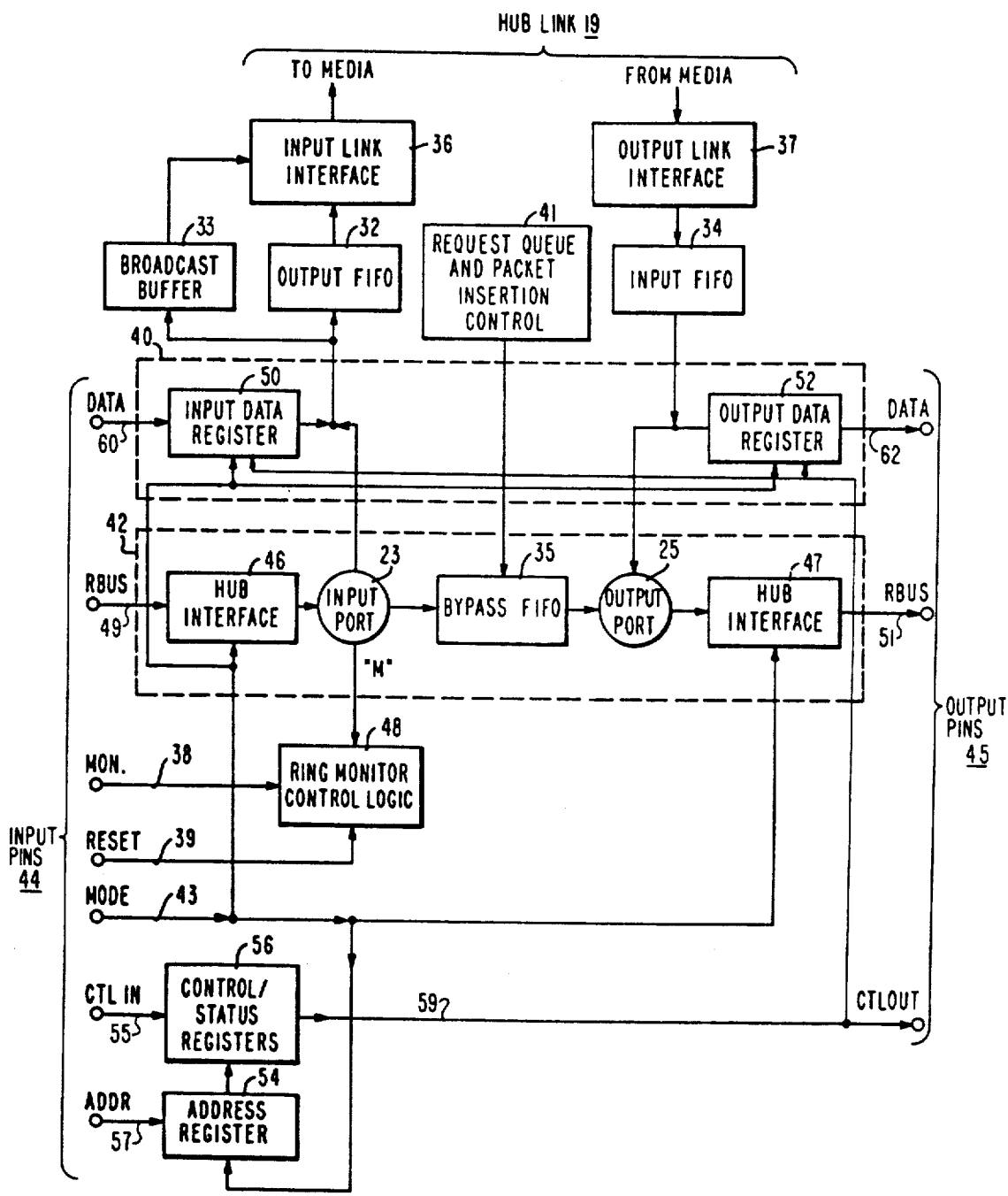

Refer to FIG. 3. The Node Controller mode is selected by the mode select line (43). The node interface logic (40) is activated which places the input data register (50) in the path between the data input pins (60) and the output FIFO (32), and places the output data register (52) in the path between the input FIFO (34) and the data output pins (62).

Memory-Mapped Control/Status Interface

The Node Controller mode select line (43) also activates the address register (54) and the control/status registers (56) and the signals CTLIN (55) and ADDR (57) that control them. Either a 16 or 32-bit data bus is selected by the 16/36 bus select pin (not shown) along with the mode select line (43) at reset time.

Once the CLIC is reset and the basic mode is selected, the Node Controller operations are controlled by writing into the Control/Status registers (56) over the CTLIN (55). These are a set of memory-mapped registers that control the operation of the Node Controller.

The control/status interface is similar to a RAM memory interface. It can be written or read, with the register to be used selected by address lines ADDR (57) into address register (54). To simplify decoding and minimize the number of pins required, only three address lines and a chip select are used to access the registers. All accesses are two clocks in length and synchronized with the bus clock source (7).

All registers in the Node Controller are 32-bits in length and messages are transferred in 32-bit words. The 16-bit bus operation divides the word operations into two 16-bit operations. For a register access to be completed, both halves must occur, the second half completing the action.

Interrupts

Interrupts are used to notify the protocol processor (2) of various events, such events as a message has arrived, an error has occurred, or output data is required. Formatting and masking options are provided for handling the various interrupts. One or two interrupt lines are available, with the input and output channels either sharing a single line or each using a separate line. The default mode is a single interrupt.

Message Transfer on Node Controller I/O Bus

Messages are transferred from the protocol processor (2) to the Node Controller (6) as a contiguous string of words on the Node Controller I/O Bus (17), which includes a bidirectional data line (60, 62). The protocol processor controls the transfer of the message such that there are no breaks in it. The 32-bit I/O Bus mode only allows full word transfers, the 16-bit mode, only half-word. Messages that are less than an integral number of words in length are handled through the control/status registers (see TABLE I) in the node controller. Message length is transferred when initiating output and is used to determine the actual number of bytes transmitted on the link. If the message length is less than an integral number of words, the last word (or half-word) transferred on the I/O bus is truncated in the Node Controller.

When messages are received, a full word containing the last byte or bytes of the message is transferred to the node controller. An input status register, shown in TABLE I indicates the number of valid bytes in the last word.

All data alignment, assembly and disassembly of messages is the responsibility of the protocol processor with its DMA controller. The Node Controller specifies the actual message length on output initiation and reports the number of bytes in the last word of an input transfer status.

The DMA interface (17) with the protocol processor utilizes two sets of DMA request/acknowledge signals, one for input and one for output. The DMA request signal from the Node Controller indicates that a data transfer is desired, the acknowledge from the DMA controller in the protocol processor indicates that the request is granted. The timing of the actual transfer is controlled by write/read signals from the DMA controller and a ready signal from the Node Controller. The input and output logics are totally independent, allowing full duplex operation. All data transfers to or from the Node Controller require two clock cycles, once DMA acknowledge has been received. Pipelined transfers can take place.

I/O Bus Signaling

The Node Controller I/O bus (17) is synchronized with the subsystem bus clock (7) shown in FIG. 1. The bus clock is derived from a 2X clock supplied to all the parts, with the bus clock referenced to the reset signal for the parts and subsystem. All output and input timing is referenced to the low-going edge of the bus clock.

The DMA Request lines are the only exception, as they must be deasserted relative to the assertion of DMA acknowledge. Two alternatives are provided for handling transfer cycle initiation. Each alternative has its own pair of I/O pins, requiring the other pair to be disabled. Tying the pins to Vcc disables them.

Bus Signals

The following signals are used to interface to the Node interface (40). All inputs are sampled on the falling clock edge at the end of the bus cycle and all outputs are driven after the falling edge, unless otherwise noted.

CLK: input—1X cycle

WR#: input—Control signal used to initiate a write transfer to the Node Controller. WR# is asserted for one bus cycle with data transferred on the next bus cycle to the Node Controller. (Must be tied to Vcc when ADS# is used.)

RD#: input—Control signal used to initiate a read transfer from the Node Controller. RD# is asserted for one bus cycle and the Node Controller returns data on the next bus cycle. (Must be tied to Vcc when ADS# is used.)

Ready#: output—Control signal from the Node Controller used to terminate a read or write transfer. Ready# is asserted the bus cycle following a WR#, RD#, or the alternate control signal, ADS#. The two cycle timing can be violated under mode control for pipelined DMA where additional timing is needed to cleanly terminate a transfer.

DREQ0, DREQ1: output—Two DMA request lines are supplied, one for the input channel (60), one for the output channel (62). The timing for the signal varies, depending on whether pipelined requests are enabled. DREQn# is asserted synchronously with the clock, but is deasserted asynchronously in the nonpipelined mode.

DACK0#, DACK1#: input—Two DMA acknowledge inputs are paired with their corresponding DREQn# signals. Data transfers can occur the clock cycle after DACKn# is asserted. WR#, RD#, or ADS# initiate the actual data transfer after DACKn# is asserted.

ADS#: input—Control signal used to initiate a write or read transfer with the Node Controller. When used in conjunction with W/R#, it replaces the WR# and RD# signals. (Must be tied to Vcc when WR# and RD# are used.)

W/R#: input—Control signal used to identify a bus transfer as a read or write when ADS# is used to initiate a bus cycle. (Must be tied to Vcc when WR# and RD# are used.)

CS#: input—Chip Select, is used to select the Node Controller when a memory-mapped access is performed. CS# is typically generated from high order address lines and is anded with the transfer initiation control signals (WR#, RD#, or ADS#) at the trailing edge of the bus cycle. Both CS# and the transfer control signal must be asserted to perform a memory-mapped transfer.

Addr2-4: input—These address lines, included in ADDR (57), select the register or I/O port to be accessed on a memory-mapped transfer, as shown in TABLE I. Each register is 32-bits in length, so the address bits start at 2 instead of 0. The address lines are sampled with the falling edge of bus cycle along with CS#.

Addr1: input—This address bit, included in ADDR (57) is sampled only if 16-bit mode is enabled. When transferring data to/from the register, the high order half-word must be transferred first, followed by the low-order half-word. The second cycle initiates the loading of the register.

Data 0-31: input/output—Bidirectional data DATA (60, 62) lines used to transfer information in and out of the Node Controller.

Int 0-1: output—Two interrupt signals are provided for indicating state changes in the Node Controller to the protocol processor. Either one or both the interrupts may be used, depending on the mode selected.

Register Definition

Refer to TABLE I. Two classes of registers are implemented in the Node Controller, direct access and indirect access. The direct registers are used for handling normal message flow. The indirect registers are used for initialization and diagnostic registers. The three word-address lines (ADDR4-2) are decoded to provide access to the direct registers. Direct register number 6, called the Indirect Address Register, is used to provide a second level of addressing for the indirect registers. This second level addressing is invoked when the Indirect Register, a direct register, is accessed. This provides additional access to the internal registers without having to connect a large number of address lines. The addresses and names of the registers are summarized below.

TABLE I

| CONTROL/STATUS REGISTERS | | |
|---|---|---|
| Direct Access Registers first level addressing | | |
| ADDR4-2 | Register Name | Direction |
| 0 | Initiate Output | wr |
| 1 | Output Status | rd |
| 2 | Enable Input Channel | wr |
| 3 | Input Status | rd |
| 4 | reserved | — |
| 5 | reserved | — |
| 6 | Indirect Address | wr |
| 7 | Indirect Register Access | rd/wr |
| Indirect Access Registers second level addressing | | |

Hub Link Interface

In FIG. 1, the connection (19) between a node controller (6) and the hub (9) is called a hub link. The link interface is more fully described in U.S. Pat. No. 4,939,724. The hub link (19) requires a node comprised of a CLIC (6) with the Node Controller mode selected and a CLIC (10) with the Ring Controller mode selected in the hub (9). The Hub link supports high speed, full duplex operation with full message buffering and flow control.

The link connection uses off-the-shelf media interfaces, such as the 82501 Manchester encoding/decoding component and TAXI FDDI interface components. These components have different signaling and data format requirements, requiring specific I/O interfaces to interconnect them.

Flow control between the two CLICs (6 and 10) terminating the ends of the link is maintained through transmission of control information in both directions. Messages are formed into packets for transmission on the link and a header is appended to the message for control information. The header is generated by the source CLIC and removed by the CLIC receiving it on the other end of the link.

Message packets are transmitted simultaneously in both directions over the full duplex link. Control information for messages transmitted in one direction is piggy-backed on packets flowing in the opposite direction.

Flow control is used to prevent overrun of the Input FIFO in the CLIC receiving the message while allowing maximum use of the available bandwidth. The mechanism minimizes the impact of links spanning long distances or which are operating at very high performance levels. In both of these cases, significant amounts of a message can be in transit on the link at any instant relative to the available buffer size. The control information and smaller packet sizes eliminates the effect of the pipeline on bandwidth usage and latency.

Physical Media Interfaces

The CLIC will operate in a synchronous physical environment, whether it is configured as a Ring Controller or a Node Controller. The Ring Controllers in a hub all receive the same synchronous clock, which drives the internal logic and provides a reference for the ring bus. The Node Controller uses the bus clock to drive the internal logic and provide a reference for the I/O Bus timing. The link interface, however, is asynchronous to the internal logic of the CLIC and may operate at a substantially greater frequency than the internal logic.

The media interface is responsible for providing the synchronization signals for outgoing messages from the CLIC and synchronization for incoming signals. The 82501 provides a good example. It provides a transmit clock to the CLIC that the CLIC uses to time its outgoing data. The 82501 encodes the data and passes it on to the line driver component. On receiving data, it decodes the data from the input signal and supplies it with a receive clock to the CLIC.

The CLIC Input and Output Ports (23 and 25) are separate and operate independently of each other. Two sets of input and output ports are provided. The serial input/output ports provides a direct 82501 interface. The parallel input/output ports provide a direct TAXI component interface.

802.3 links will use the same interface, but with different internal CLIC logic to handle the half-duplex mode

Ring Controller Mode of Operation

Referring to FIG. 3, the Input FIFO (34) and Output FIFO (32) provide buffering for collecting the data from the node over the link interface (36, 37) before it is transferred on the ring bus (51), and for receiving data (49) from the ring bus at the ring bus rate. The broadcast buffer (33) is used to receive and buffer messages broadcast from a single node to several nodes as more fully described in copending application Ser. No. 07/291,594.

While the next packet of a message is collected at the ring controller input FIFO (34), the ring bus is available for data packet transfers between other Ring Controllers. The large FIFOs allow data to be collected at the source node controller until the destination path is free to accept the data.

Input and Output Ports

Each Ring Controller has an Input Port (23) and an Output Port (25) used for receiving (49) packets from the upstream Ring Controller and transmitting (51) packets to the downstream Ring Controller. These are unidirectional ports, one receiving, the other transmitting. Data is transferred from every Output Port to every Input Port on the Ring Bus each Ring Bus Controller to identify packets that contain errors.

Ring Packet Headers

The Packet Header is constructed by the ring controller at the source of the packet. The information in the header is used for communication between Ring Controllers and is not included in the message transmitted to the node. Packet headers contain the destination address of the message and the source ID from the Ring Controller. A 5-bit encoded Packet Identifier defines the function of the packet and how to interpret the remaining fields. New packets are placed on the ring through a "register insertion" mechanism which includes a bypass FIFO (first-in first-out) register (35) and control logic (41). While the new packet is transferred to the next Ring Controller, over the ring bus (51), incoming packets are stored in the bypass FIFO (35).

Monitor Mode

One Controller per hub is identified as the Ring Monitor by asserting the Ring Monitor pin (38) before Reset (39) is deasserted. It must be asserted through the last clock that the Reset is asserted. The Ring Monitor pin of the controller (12) in FIG. 1 designated as the Ring Monitor is used to input the Hub ID of the ring hub to which it is attached. The Hub ID is passed to the other Ring Controllers.

Ring Mode

The mode pin (43), which identifies the cluster interface controller (CLIC) as either a Node Controller or Ring Controller, is asserted before and during the time Reset (39) is asserted. It identifies the I/O Pin (44, 45) usage for the mode chosen and therefore the other valid inputs during Reset.

Ring Monitor

The Ring Monitor (12) of FIG. 1 is used to arbitrate all broadcast messages. It provides a central coordination point on the Ring Bus for those source Ring Controllers desiring to broadcast a message. Transfer requests for broadcast messages are made to the Ring Monitor. The Ring Monitor queues broadcast requests as if they are normal requests, just as any destination Ring Controller would do. It then starts the actual transfer and interacts with the source Ring Controller. The other Ring Controllers see the Broadcast Encoding in the Packet Header and copy the packet into their Broadcast Buffer.

While the invention has been particularly shown and described with reference to preferred embodiments thereof, it will be understood by those skilled in the art that the foregoing and other changes in form and detail may be made therein without departing from the scope of the invention.

What is claimed is:

1. A first cluster interface controller operable in a ring controller mode when said first cluster interface controller is connected to a second cluster interface controller by way of a ring bus (49, 51) and operable in a node controller mode when said first cluster interface controller is connected to said second cluster interface controller by way of an I/O bus (60,62) of a processor, said first cluster interface controller comprising:

an input link interface (36);
an output link interface (37);
said input link interface (36) an said output link interface (37) connected to said second cluster interface controller over a hub link interface (19);
a node interface logic (40);
a ring bus interface logic (42);
a set of input pins (44);
a set of output pins (45));
said node interface logic (40) including an input data register (50) connected to said set of input pins (44) and an output data register (52) connected to said set of output pins (45);
said ring bus interface logic (42) including an input port (23) and an output port (25);
said ring bus interface logic (42) including a first hub interface logic (46) connected to said set of input pins (44) and to said input port (23) for receiving message packets from said set of input pins (44) and a second hub interface logic (47) connected to said output port (25) and to said set of output pins (45) for transmitting message packets to said set of output pins (45); and
a common logic;
said common logic including an output FIFO buffer (32) connected to said input link interface (36), to said input data register (50) to said input port (23);
said common logic including an input FIFO buffer (34) connected to said output link interface (37), to said output data register (52) and to said output port (25);
mode selection means (43) connected to said node interface logic (40) and to said ring bus interface logic (42), for selecting, when set to a first state, the node controller mode of operation wherein said node interface logic (40) is activated for operation, and for selecting, when set to a second state, the ring controller mode of operation wherein said ring bus interface logic (42) is activated for operation;
said node interface logic (40) being responsive to said mode selection means (43) for activating said input data register (50) connected to said set of input pins (44) and said output data register (52) connected to said set of output pins (45) when said mode selection mans is set to said first state;

said ring bus interface logic (42) being responsive to said mode selection means (43) for activating said first hub interface logic (46) connected to said step of input pins (44) and said second hub interface logic (47) connected to said set of output pin (45), when said mode selection means is set to said second state.

2. The first cluster interface controller in accordance with claim 1 wherein said input pins (44) include a control-in pin (55) and an address-in pin (57), said first cluster interface controller further including:

an address register (54); and, control/status registers (56);

said address register (54) being connected to said address-in pin (57), to said mode selection means (43), and to said control/status registers (56) for addressing particular ones of said control/status registers in response to an address received on said address-in pin (57), said particular ones of said control/status registers (56) being selected by said address written into said address register (54) over said address-in pin (57), said control/status registers (56) further being connected to said control-in pin (55) and to said node interface logic (40), for providing an output (59) that controls the operation of said node interface logic (40) in response to information received on said control-in pin (55);

said address register (54) being activated when said mode selection means (43) is set to said first state.

* * * * *